(12) United States Patent
Saubolle

(10) Patent No.: US 7,095,329 B2
(45) Date of Patent: Aug. 22, 2006

(54) RADIATION MONITOR FOR EASE OF USE

(76) Inventor: Malcolm Saubolle, 45 Metzak Drive, Brampton, Ontario (CA), L6Z 4N4

(*) Notice: Subject to any disclaimer, the term of this patent is extended or adjusted under 35 U.S.C. 154(b) by 475 days.

(21) Appl. No.: 10/396,389

(22) Filed: Mar. 26, 2003

(65) Prior Publication Data

US 2004/0189467 A1 Sep. 30, 2004

(51) Int. Cl.
G08B 17/12 (2006.01)

(52) U.S. Cl. .................. 340/600; 340/540; 340/629; 73/170.27

(58) Field of Classification Search ............ 340/600, 340/540, 500, 629, 815.4; 250/367, 372, 250/388, 389, 336.1; 73/170.27
See application file for complete search history.

(56) References Cited

U.S. PATENT DOCUMENTS

| | | | | |
|---|---|---|---|---|
| 4,527,064 A | * | 7/1985 | Anderson | 250/374 |
| 4,596,933 A | * | 6/1986 | Waechter et al. | 250/388 |
| 4,598,202 A | * | 7/1986 | Koechner | 250/366 |
| 4,642,463 A | * | 2/1987 | Thoms | 250/336.1 |
| 4,818,884 A | * | 4/1989 | Saubolle | 250/388 |
| 4,827,414 A | * | 5/1989 | Christianson et al. | 250/390.01 |
| 4,931,646 A | * | 6/1990 | Koechner et al. | 250/367 |
| 6,388,259 B1 | * | 5/2002 | Murdock | 250/370.01 |

* cited by examiner

Primary Examiner—Phung Nguyen
(74) Attorney, Agent, or Firm—Shoemaker and Mattare

(57) ABSTRACT

Provided is a nuclear radiation monitor which has a surface on which are located separate, visible indicia, such as LEDs or an LCD array, with the indicia being distributed around an imaginary closed loop, preferably of circular configuration. The monitor includes a radiation-sensitive apparatus, including a radiation sensor, and the apparatus is adapted to create a discharge every time a particle or pulse of radiation strikes the sensor window with sufficient intensity. The device incorporates electrical circuitry for causing sequential discharges to energize the visible indicia in a similar sequence, such that the indicia are perceived to be in motion around the loop, with a rotational speed substantially proportional to the frequency of occurrence of the discharges. Included on the surface is a central area depicting an atom with at least 3 indicia, such as LEDs or an LCD array, which flash when a preset threshold is exceeded by the radiation rate. Also included in the unit is an audible alarm that cycles in sympathy with the flashing indicia.

14 Claims, 2 Drawing Sheets

FRONT VIEW

FRONT VIEW
Fig. 1
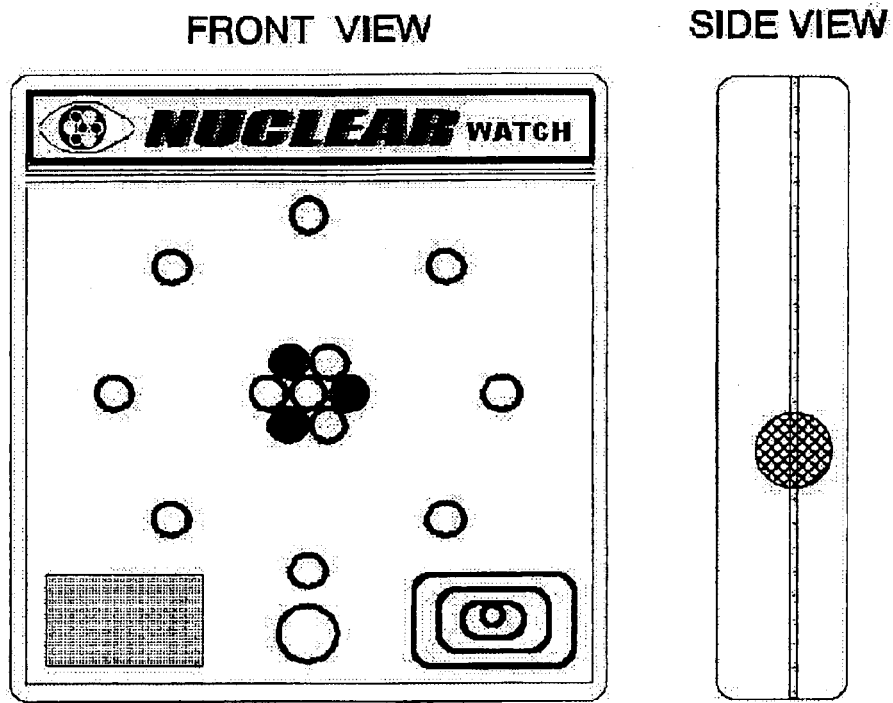
SIDE VIEW
Fig. 2
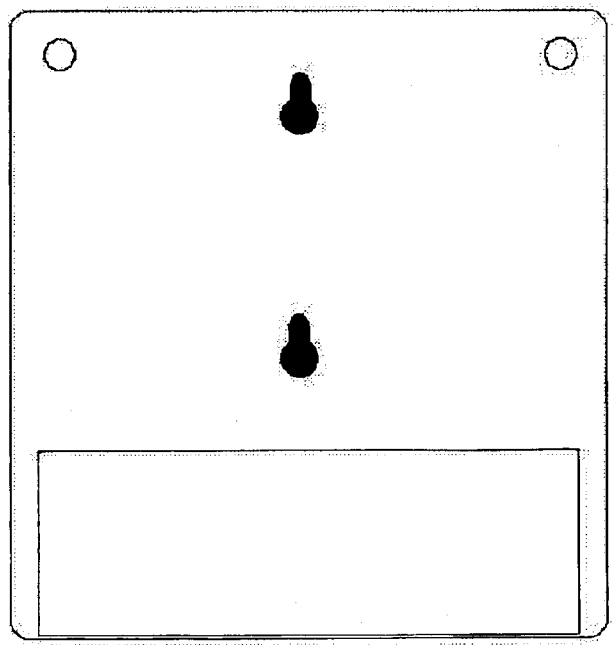
Fig. 3
BACK VIEW

RADIATION MONITOR FOR EASE OF USE

FIELD OF THE INVENTION

This invention relates generally to radiation monitors, and relates particularly to a monitor sensitive to nuclear radiation and the like.

BACKGROUND OF THE INVENTION

Nuclear radiation monitors are currently available in a number of designs, which meet the needs of the professional user. Conventional industrial designs use moving coil meters, multi-digit seven-segment displays, selectable ranges and time constants. These features, aside from being too complicated and confusing for the nonprofessional user, tend to make the cost of the unit too high for the average consumer.

SUMMARY OF THE INVENTION

Described below is a proposed apparatus, which eliminates the unnecessary features described above. In addition, it offers an appealing presentation, which is easy to interpret, has a reasonable cost and does not sacrifice accuracy.

The apparatus described herein differs significantly from traditional displays and utilizes a unique method which clearly and unambiguously alerts the user to:

The existence of radiation

An increase in radiation

An excess of radiation

The unique display is at the heart of the product in as much as it allows the observer to experience the measurement almost subconsciously, rather than forcing one to look at and interpret meaningless meters, bar graphs or numbers normally understandable only by one who has studied the subject of radiation and its measurement.

Accordingly, this invention is directed to a nuclear radiation monitor, comprising:

a monitor surface, a plurality of separate, visible indicia located on the monitor surface, the indicia being distributed in an imaginary closed loop, a radiation-sensitive apparatus including a radiation sensor, the apparatus being adapted to create a discharge every time a threshold of radiation intensity is exceeded at the location of the sensor, and, electrical circuitry for causing a sequence of discharges to energize the visible indicia in a similar sequence, whereby the indicia are perceived to be in motion around the loop, with a rotational speed substantially proportional to the frequency of occurrence of the discharges, (Note: Throughout the remainder of this description and claims, the word indicium will be used as a general reference to a single one of the visible LEDs, the plural being indicia. It should also be noted that other types of display elements could be substituted to achieve a similar effect. Conversely, in the PREFERRED EMBODIMENTS, the preferred LEDs are only one type of possible indicia. These meanings are supported by The Random House Dictionary of the English Language [unabridged] Copyright 1966)

Further, this invention provides a method of monitoring a given region for the presence of nuclear radiation, utilizing a surface on which are located a plurality of separate, visible indicia distributed around an imaginary closed loop, a radiation-sensitive apparatus which includes a radiation sensor for positioning in said given region, the apparatus being adapted to create a discharge every time a source of radiation results in the ionization of the sensor at its location, and electrical circuitry for energizing the visible indicia in a sequence based on the created discharges, the method incorporating the steps:

a) positioning the radiation sensor in said given region, b) causing the apparatus to create a discharge every time a source of radiation results in the ionization of the sensor at its location, c) causing the electrical circuitry to energize the visible indicia in sequence, whereby the indicia are perceived to be in motion around the loop with a rotational speed substantially proportional to the frequency of occurrence of the discharges,

BRIEF DESCRIPTION OF THE DRAWINGS

One embodiment of this invention is illustrated in the accompanying drawings, in which like numerals denote like parts throughout the several views and in which:

FIG. 1 is an elevation view of a nuclear radiation monitor, as seen looking directly at the display face;

FIG. 2 is a side elevation thereof;

FIG. 3 is a rear elevation view thereof; and

DETAILED DESCRIPTION OF THE PREFERRED EMBODIMENTS

Figure 4:
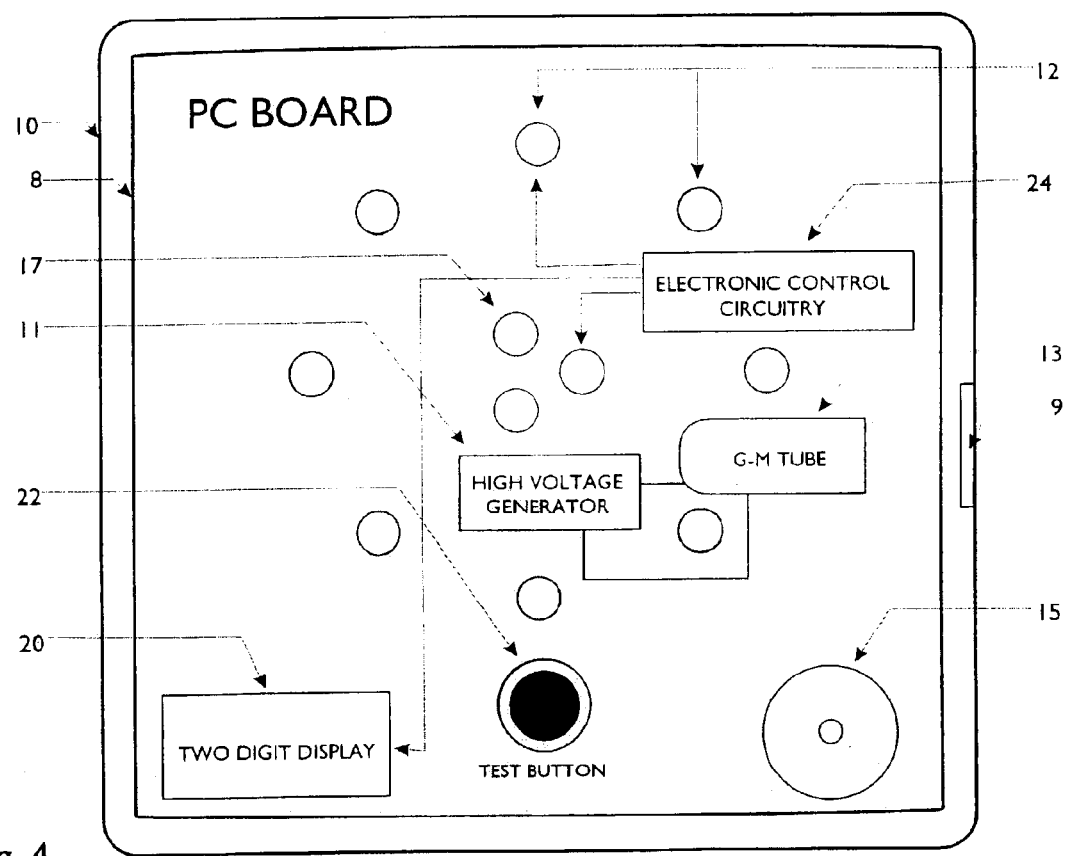
FIG. 4 is a schematic view of the circuitry used in the monitor.

As shown in FIG. 4, the control circuitry, the details of which are not a part of this invention, includes a Printed Circuit Board 8, which fits into a suitable housing 10. The function of the circuitry is to sense the presence of radioactivity at the location of the sensor window 9, and the rate at which it occurs, and to create an alarm signal when a predetermined threshold level is exceeded. In a preferred embodiment, the level chosen is equivalent to 5 rems/year, which is regarded as an allowable safe limit for the industry.

Also included in the circuitry is a high-voltage power supply 11, capable of generating the necessary voltage to power a Geiger tube 13.

A circular array of indicia, preferably employing LEDs or an LCD array 12, is driven in such a manner that only a single indicium is "visible" at any given time.

With this arrangement, the speed of the sequential movement as the individual indicia are energized around the circular array is an indication of the intensity of the radiation field. Random background cosmic radiation also drives the indicia, and shows the observer that the device is operational.

The monitor preferably also includes audible alarm 15 and visible alarm 17 warning devices, which are activated when the radiation in the vicinity of the sensor window 9 exceeds an allowable threshold. For example, an audible alarm 15 with an audible tone frequency of 1 kHz and a duty cycle of 1 Hz can be triggered when the radioactivity level reaches the equivalent of 5 rems/year. The attainment of this level of radiation can also be indicated by a visual alarm 17 in the form of one or more indicia (referenced earlier in [0006] as the "central display composed of 3 or more indicia") located approximately at the center of the "circle" of traveling indicia, and adapted to flash on and off at any desired frequency.

For the sake of complete disclosure, a workable embodiment incorporates the following characteristics and equipment:

The device is powered by an approved Class II Power Supply, eliminating the UL/CSA approval requirements for the device. A backup battery may also be used in case of a power failure.

The detector is a Geiger-Mueller Counter Tube 13.

The alarm threshold is set for an annual rate of 5 rems/year, which is the equivalent to a scaled per minute rate of 19.03 micro rems/minute.

The alarm activation should be continuous during the existence of a radiation field, and terminate approximately three seconds after the radiation level falls below the alarm threshold.

As mentioned previously in [0006], an audible alarm 15 can have a tone frequency of 1 kHz and a duty cycle of 1 Hz.

The visual alarm 17, which may take the form of three indicia at the center of the display, may flash with a duty cycle of 1 Hz.

The size of the monitor 10 shown in the drawings may be approximately 4.5"×5"×1.5", this being for a wall-mounted device.

Details of Circuitry

A Geiger-Mueller tube 13, capable of measuring alpha, beta and gamma radiation, is used to detect the presence of radiation. A Johnson Counter (which along with all other electronics is part of the electronic control circuitry module 24) is triggered by the output of the Geiger tube 13 and the outputs are used to drive eight or more indicia 12 sequentially. The indicia are mounted in a circle (although other shapes could be chosen), with only one indicium lit at any given time. The display has the appearance of a light rotating in a circle, suggesting an electron rotating around a nucleus. As the radiation increases in intensity, the display appears to rotate more quickly.

In the absence of a radiation field, the light rotates in step with cosmic rays striking the Geiger tube 13, conveying the fact that the product is operational. As a radiation field approaches the window of the Geiger tube 13, the rotation increases in speed. The speed of the rotation is a measure of the intensity of the radiation, thus displaying an increase or decrease in radiation.

A dual cascaded decade counter counts the output of the Geiger tube 13 at the same time. The outputs of the BCD (Binary Coded Decimal) counters are decoded to have an output from the decoder when 18 counts have been reached. With the Geiger tube 13 used, 18 counts represents the maximum allowed annual dose of 5 rems/year related to one second. The output of this decoder triggers a re-triggerable monostable, arranged to have a run time greater than 1 second and preferably several seconds. The output of this decoder is gated with a 1 second square wave and is used to drive a transistor, which in turn drives the array of three or more indicia 17 that flash on and off at a 1 second rate. This drive also activates a piezo-ceramic transducer 15A, which generates a sound signal with a frequency of 1 kHz and an on/off period of one second.

From the output of the Geiger tube 13, a monostable with a 1 second run time is also triggered. The output is used to reset the dual decade counter to ensure that only counts during the monostable run time are counted to assess the counts per second. If the counts per second are less than 18, the first monostable eventually runs out and the alarm from a previous count of more than 18 is switched off.

When 18 counts are reached, and the instrument successfully warns the user by alarming both visually and audibly, the instrument has achieved its goal. Beyond this point the display rotates rapidly, making any further increase in radiation hard to discern. As an additional feature, a low cost double digit display 20 is added. This is achieved by using two BCD to 7 segment decoders, to decode the dual decade counters and to drive the double-digit display 20.

The two digits display counts/second up to a maximum of 99 counts. The number 99 is decoded and used to disable the counter to read 99, when this number is exceeded.

Because of this addition and as a general test of the product, a test button 22 is added to use the 1 kHz signal of the audible alarm, to drive the input of all the counters. This sets all the indicia on, including the audible alarm, and makes the two-digit display read 99. This test does not check the integrity of the Geiger tube 13. The operation of the Geiger tube 13 becomes apparent when the tube measures the random cosmic rays. If after checking the instrument with the test button 22, no activity occurs on the rotating display, this is an indication of a defective tube or loss of high voltage.

Theory of Measurement

There are three types of atomic radiation, known as alpha, beta and gamma.

Alpha and beta are particles, which have a limited capability of penetration. Alpha particles can be stopped by a piece of paper, while beta particles require a thicker material such as a piece of cardboard to stop their penetration.

Alpha and beta particles can be removed from the skin by washing the affected part with soap and water. Although these particles sound harmless, it should be understood that inhaling them could cause a lot of harm internally.

Gamma radiation consists of high-energy bursts of electromagnet waves such as radio, radar and microwaves. These waves can cause severe damage and they need a large thickness of material, such as steel or concrete, to stop them. They travel freely through the human body, and if they strike anything on the way, they can cause damage to cells and other parts of the body.

The earth is bombarded by cosmic rays, which are gamma rays generated by solar activity. These rays, known as background radiation, are small and generally harmless. As one moves further away from the earth, these rays increase in intensity. The background radiation is a lot higher for people who fly, such as pilots.

A safe dose for humans who are not associated with the atomic industry is set at 5 rems/year, which is an accumulated dose of radiation. A dose rate of 0.57 millirems per hour would accumulate 5 rems per year.

The industrial grade Geiger tube used in this instrument measures alphas, betas and gammas, and it counts each radiation pulse that strikes its sensing window. It counts an average of 32.54 counts per second for a radiation rate of 1 millirem per hour; for a radiation rate of 0.57 millirems per hour, this would be an average count rate of 18.57 counts per second.

The measuring threshold is set at 18 counts per second, to warn the user when the allowed radiation dose rate has been exceeded.

This does not necessarily mean that there is any serious danger, but does indicate that there is excessive radiation reaching the detector which should not be there.

If the radiation level just exceeds 18 counts per second, and if this dose continues for one year, an exposed person will have accumulated the maximum dose by the end of that year.

Background Radiation

Most measuring instruments are interested in radiation levels greater than background. These instruments use elaborate circuits to eliminate the background radiation from their tests. The measuring devices are linearized to ensure an accurate reading of the radiation. Various selectable ranges are used to cover a large range of levels of radiation. These are only some of the considerations for industrial measuring devices, making them very costly and out of the reach of the general public.

The general public is not necessarily interested in the meaning of the various terms associated with radiation and the actual value or strength of the radiation. This instrument eliminates these problems by considering only the absence or presence of radiation similar to smoke and CO detectors, which are now commonplace in most homes.

By doing this, a lot of costly embellishments are eliminated, making it possible to provide a radiation detector that the general consumer can afford and understand.

Background radiation is normally very low; for this instrument it is an average of only 10 counts per minute. This relates to 0.17 counts per second or an average of a count every 6 seconds. This level is approximately $1/100$ of the level that the threshold is set at.

For this instrument the background is used to activate a display that advances clockwise for each pulse that strikes the detector window. Compared with smoke and CO detectors, this instrument always shows that it is operational by randomly rotating the visible display in step with the background and other introduced radiation.

Warning Signs

If the radiation increases due to radiation that should not be present, the display responds by rotating faster as an indication of the increase of unwanted radiation, either in the surrounding atmosphere or generated by a radioactive article that is brought near the sensing window on the right side of the instrument.

If the rate of radiation increases to the point where the threshold level is exceeded, the atomic symbol in the center of the instrument flashes and an audible alarm is activated.

Note: as stated before, this does not necessarily indicate a serious danger, but is an indication that there is radiation that should not be present.

One hopes that the background radiation will never exceed the safe level, and until it does, the device continues displaying the background radiation in a randomly rotating manner, which is more pleasant to watch than meaningless numbers flashing on a numeric display.

While one embodiment of this invention has been illustrated in the accompanying drawing and described hereinabove, it will be evident to those skilled in the art that changes and modifications may be made thereto, without departing from the essence of this invention, as set forth in the appended claims.

In particular, it is clear that the electronic functions may be implemented by means of other logic such as PLA's, microcomputers, etc.

What is claimed is:

1. A nuclear radiation monitor, comprising:
   a monitor surface,
   a plurality of separate, visible indicia located on the monitor surface, the indicia being distributed in an imaginary closed loop,
   a radiation-sensitive apparatus including a radiation sensor, the apparatus being adapted to create a discharge every time a source of radiation results in the ionization of the sensor at its location as a result of interaction between the sensor and a radiative phenomenon, and
   electrical circuitry for causing sequential discharges to energize the visible indicia in a similar sequence, whereby the indicia are perceived to be in motion around the loop, with a rotational speed substantially proportional to the frequency of occurrence of the discharges.

2. The nuclear radiation monitor claimed in claim 1, in which the circuitry energizes the indicia such that only a single indicium is energized at any given time.

3. The nuclear radiation monitor claimed in claim 2, in which energization of a given indicium begins substantially simultaneously with the cessation of energization of the previous indicium, whereby there is always one indicium energized at any given time.

4. The nuclear radiation monitor claimed in claim 3, in which each discharge energizes one indicium.

5. The nuclear radiation monitor claim in claim 1, in which the radiation sensor includes a Geiger-Mueller Counter Tube, and in which the indicia are selected from the group consisting of LED's and an LCD array.

6. The nuclear radiation monitor claimed in claim 1, in which the closed loop is substantially a circle.

7. The nuclear radiation monitor claimed in claim 1, wherein the radiation phenomenon is one or more selected from the group consisting of: alpha-particles, beta-particles, and electro-magnetic pulses.

8. A nuclear radiation monitor, comprising:
   a monitor surface,
   a plurality of separate, visible indicia located on the monitor surface, the indicia being distributed in an imaginary closed loop,
   a radiation-sensitive apparatus including a radiation sensor, the apparatus being adapted to create a discharge every time a source of radiation results in the ionization of the sensor at its location as a result of interaction between the sensor and a radiative phenomenon, and
   electrical circuitry for causing sequential discharges to energize the visible indicia in a similar sequence, whereby the indicia are perceived to be in motion around the loop, with a rotational speed substantially proportional to the frequency of occurrence of the discharges, wherein if the discharges occur at a frequency average which exceeds a predetermined level, a central display composed of at least 3 indicia representing the atomic symbol is turned on by said electrical circuitry.

9. The nuclear radiation monitor claimed in claim 8, in which the electrical circuitry, when turning the indicia on, simultaneously also turns on an audible alarm.

10. A method of monitoring a given region for the presence of nuclear radiation, utilizing a surface on which are located a plurality of separate, visible indicia distributed in an imaginary closed loop, a radiation-sensitive apparatus which includes a radiation sensor for positioning in said given region, the apparatus being adapted to create a discharge every time a source of radiation results in the ionization of the sensor at its location as a result of interaction between the sensor and a radiative phenomenon, and electrical circuitry for energizing the visible indicia in a sequence based on the sequential discharges, the method incorporating the steps:

a) positioning the radiation sensor in said given region,
   b) causing the apparatus to create a discharge every time said source of radiation results in the ionization of the sensor at its location, and c) causing the electrical circuitry to energize the visible indicia in sequence, whereby the indicia are perceived to be in motion around the loop with a rotational speed substantially proportional to the frequency of occurrence of the discharges.

11. The method claimed in claim 10, in which the indicia are energized such that only a single indicium is energized at any given time.

12. The method claimed in claim 11, in which energization of a given indicium begins substantially simultaneously with the cessation of energization of the previous indicium, whereby there is always one indicium energized at any given time.

13. The method claimed in claim 12, in which each discharge energizes one indicium.

14. The method claimed in claim 13, in which the radiation sensor includes a Geiger-Mueller Counter Tube, and in which the indicia are LEDs or an LCD array.

* * * * *